United States Patent
Iura

(10) Patent No.: US 10,015,024 B2
(45) Date of Patent: Jul. 3, 2018

(54) WIRELESS COMMUNICATION APPARATUS AND WIRELESS COMMUNICATION METHOD

(71) Applicant: Mitsubishi Electric Corporation, Chiyoda-ku (JP)

(72) Inventor: Hiroki Iura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/512,684

(22) PCT Filed: Oct. 1, 2015

(86) PCT No.: PCT/JP2015/077959
§ 371 (c)(1),
(2) Date: Mar. 20, 2017

(87) PCT Pub. No.: WO2016/056462
PCT Pub. Date: Apr. 14, 2016

(65) Prior Publication Data
US 2017/0288910 A1    Oct. 5, 2017

(30) Foreign Application Priority Data
Oct. 7, 2014    (JP) .................................. 2014-206342

(51) Int. Cl.
*H04L 25/02*    (2006.01)
*H04J 1/02*    (2006.01)
*H04W 72/04*    (2009.01)

(52) U.S. Cl.
CPC .............. *H04L 25/022* (2013.01); *H04J 1/02* (2013.01); *H04W 72/0453* (2013.01)

(58) Field of Classification Search
CPC ...... H04L 25/022; H04J 1/02; H04W 72/0453
See application file for complete search history.

(56) References Cited

U.S. PATENT DOCUMENTS

2004/0087282 A1    5/2004   Ishikawa
2014/0141161 A1    5/2014   Bruchertseifer
(Continued)

FOREIGN PATENT DOCUMENTS

JP    2003-204317 A    7/2003
JP    2013-131133 A    7/2013
(Continued)

OTHER PUBLICATIONS

C. Kim, et al., "Multi-Beam Transmission Diversity with Hybrid Beamforming for MIMO-OFDM Systems," Globecom 2013 Workshop—Emerging Technologies for LTE-Advanced and Beyond-4G, 2013, 6 pages.

(Continued)

*Primary Examiner* — Brian D Nguyen
(74) *Attorney, Agent, or Firm* — Oblon, McClelland, Maier & Neustadt, L.L.P.

(57) ABSTRACT

A wireless communication apparatus configured to select an allocation system for transmission symbols on the basis of transmission line situations between the wireless communication apparatus and terminals includes a channel estimator to estimate transmission line coefficients between communication target terminals and sub-arrays, a resource scheduler to generate, on the basis of the transmission line coefficients, mapping information and transmission weight information by spatial multiplexing and frequency multiplexing and select and output the mapping information and the transmission weight information by one of the multiplexing systems, a symbol mapper to map transmission symbols on a frequency axis on the basis of the mapping information from the resource scheduler, and a pre-coder to perform, on the basis of the transmission weight information from the resource scheduler, a weighting operation concerning a signal mapped by the symbol mapper.

10 Claims, 11 Drawing Sheets

(56) References Cited

U.S. PATENT DOCUMENTS

| | | |
|---|---|---|
| 2014/0185550 A1 | 7/2014 | Han et al. |
| 2014/0328280 A1* | 11/2014 | Murakami .......... H04W 72/082 370/329 |
| 2014/0376355 A1* | 12/2014 | Kudo .................. H04B 7/0456 370/203 |
| 2014/0376656 A1* | 12/2014 | Agee .................. H04B 7/0413 375/267 |
| 2015/0009946 A1* | 1/2015 | Dinan ................. H04B 7/0456 370/329 |
| 2015/0023317 A1* | 1/2015 | Yokomakura ......... H04W 24/02 370/330 |
| 2015/0117229 A1* | 4/2015 | Avudainayagam ...... H04B 3/46 370/252 |
| 2015/0126236 A1* | 5/2015 | Mukherjee .......... H04B 7/0417 455/522 |
| 2015/0195019 A1 | 7/2015 | Nagata et al. |
| 2015/0326300 A1 | 11/2015 | Fujii |

FOREIGN PATENT DOCUMENTS

| | | |
|---|---|---|
| JP | 2014-27653 A | 2/2014 |
| JP | 2014-30135 A | 2/2014 |
| JP | 2014-524954 A | 9/2014 |
| WO | 2014/158208 A1 | 10/2014 |

OTHER PUBLICATIONS

T. Obara, et al., "Joint fixed beamforming and eigenmode precoding for super high bit rate massive MIMO systems using higher frequency bands," 2014 IEEE 25th International Symposium on Personal, Indoor and Mobile Radio Communications, 2014, 6 pages.
International Search Report and Written Opinion of the International Searching Authority dated Dec. 8, 2015 in PCT/JP2015/077959 filed Oct. 1, 2015.

* cited by examiner

WIRELESS COMMUNICATION APPARATUS AND WIRELESS COMMUNICATION METHOD

FIELD

The present invention relates to a wireless communication apparatus including a plurality of antennas and a wireless communication method.

BACKGROUND

In wireless communication, there is broadening of signal band width as a method for realizing large capacity communication. In a frequency band equal to or lower than several gigahertz, frequencies have already been allocated to a large number of systems. It is difficult to secure a wide signal band equal to or higher than 100 megahertz. In cellular communication in which a communication area covered by one radio base station is equal to or larger than several hundred meters, a frequency band equal to or lower than several gigahertz has to be used.

On the other hand, in a high frequency band of several ten gigahertz, there are a lot of unallocated frequencies, that is, free spaces. It is highly likely that wide signal band width equal to or higher than several hundred megahertz can be secured. However, in a high frequency band of several ten gigahertz, because a propagation distance attenuation amount is large, there is a disadvantage that a communication area cannot be secured wide. It has been considered to make it possible to greatly increase the number of antenna elements mountable per fixed area, form a beam having a high gain, and compensate for propagation distance attenuation making use of the fact that the length of one wavelength is short in a high frequency band.

To realize large capacity transmission, in addition to the broadening of a band, there is a technology called super-multi-element multiple-input multiple-output (MIMO) or Massive MIMO for spatially multiplexing transmission signals by forming a plurality of beams in a large number of antenna elements. In general, a communication apparatus of the super-multi-element MIMO includes a digital-signal processing unit that includes a series of a transmission circuit and a reception circuit for each of antenna elements and is adaptable to the number of antenna elements. For example, when there are 256 antenna elements in the super-multi-element MIMO, the communication apparatus needs to include a digital signal processing unit that uses 256 transmission circuits and reception circuits, an FPGA (Field Programmable Gate Array), an ASIC (Application Specific Integrated Circuit), and the like and is adaptable to the 256 elements. Therefore, there are problems in cost and viability.

As measures against the problems, there is a method of realizing beam formation with an analog circuit including a variable amplifier and a variable phase shifter rather than with the digital-signal processing unit. This is a method of forming an analog beam. Consequently, a required number of transmission circuits and reception circuits is not the same as the number of antenna elements and is the same as the number of beams to be formed. The digital-signal processing unit only has to be adaptable to the number of elements same as the number of beams to be formed. As an example, when one analog beam is formed by sixteen antenna elements, the number of transmission circuits and reception circuits can be reduced to $1/16$. A technology for suppressing an increase in a circuit size in this way is disclosed in Patent Literature 1 described below.

In wireless communication in recent years, a technology called OFDM (Orthogonal Frequency Division Multiplexing) or OFDMA (Orthogonal Frequency Division Multiple Access) is widely used. The OFDM or the OFDMA allocates OFDM symbols for each of a plurality of orthogonal frequencies called subcarriers.

Cellular communication is assumed in which a network is configured from a wireless communication apparatus, which is a base station, and a plurality of terminals subordinate to the wireless communication apparatus. When transmission lines between the wireless communication apparatus and the terminals have different frequency selectivities, there is user diversity for using only a subcarrier having a high transmission line gain and sharing one OFDM symbol among a plurality of terminals to obtain a frequency diversity effect among users. The user diversity is one of most important functions in the OFDMA. When there are a plurality of terminals, beam formation is individually controlled for each of the terminals. Even if a beam to a certain terminal is received by another terminal, reception power is often low and a CNR (Carrier to Noise Ratio) is small.

CITATION LIST

Patent Literature

Patent Literature 1: Japanese Patent Application Laid-Open No. 2014-27653

SUMMARY

Technical Problem

However, according to the related art, when the wireless communication apparatus transmits signals to the terminals, if the terminals move, a distribution of the terminals in the communication area changes and transmission line situations between the wireless communication apparatus and the terminals also change. Therefore, there is a problem in that, depending on the transmission line situations between the wireless communication apparatus and the terminals, a system for allocating OFDM symbols to the terminals having high transmission efficiency, that is, a multiplexing system is different.

The present invention has been devised in view of the above, and an object of the present invention is to obtain a wireless communication apparatus capable of selecting an allocation system for transmission symbols on the basis of transmission line situations between the wireless communication apparatus and terminals.

Solution to Problem

In order to solve the aforementioned problem and achieve the object, the present invention provides a wireless communication apparatus including a plurality of analog-beam formation circuits including pluralities of antennas, the wireless communication apparatus including: a channel estimating unit to estimate transmission line coefficients indicating situations of transmission lines, which are channels between communication target terminals and the analog beam formation circuits; a resource scheduler unit to generate, on the basis of the transmission line coefficients, mapping information of transmission symbols by spatial multiplexing and transmission weight information used for a weighting operation to a signal after mapping, generate mapping information and transmission weight information by frequency multiplexing, and select and output the mapping information and the transmission weight information by one of the multiplexing systems; a mapping unit to map the transmission symbols on a frequency axis on the basis of the mapping information from the resource scheduler unit; and a pre-coder unit to perform, on the basis of the transmission weight information from the resource scheduler unit, a weighting operation concerning the signal mapped by the mapping unit.

Advantageous Effects of Invention

The wireless communication apparatus according to the present invention achieves an effect that it is possible to select an allocation system for transmission symbols on the basis of transmission line situations between the wireless communication apparatus and terminals.

DESCRIPTION OF EMBODIMENTS

A wireless communication apparatus and a wireless communication method according to an embodiment of the present invention are explained in detail below with reference to the drawings. Note that the present invention is not limited by the embodiment.

Embodiment

In a high-speed wireless access system in recent years, use of carrier frequencies from several gigahertz to several ten gigahertz by an SHF (Super High Frequency) capable of securing a wide signal frequency band is examined. A carrier frequency of a conventional wireless access system is several hundred megahertz to several gigahertz. Therefore, a wireless communication apparatus includes approximately several to several ten transmission and reception antennas at most from the view point of a setting area. However, when a carrier frequency is an SHF band, length per one wavelength decreases, the number of antennas that can be set in a radio station increases to several hundred to several thousand by two dimensionally disposing the antennas. Consequently, it is possible to configure a Massive MIMO.

Figure 1:
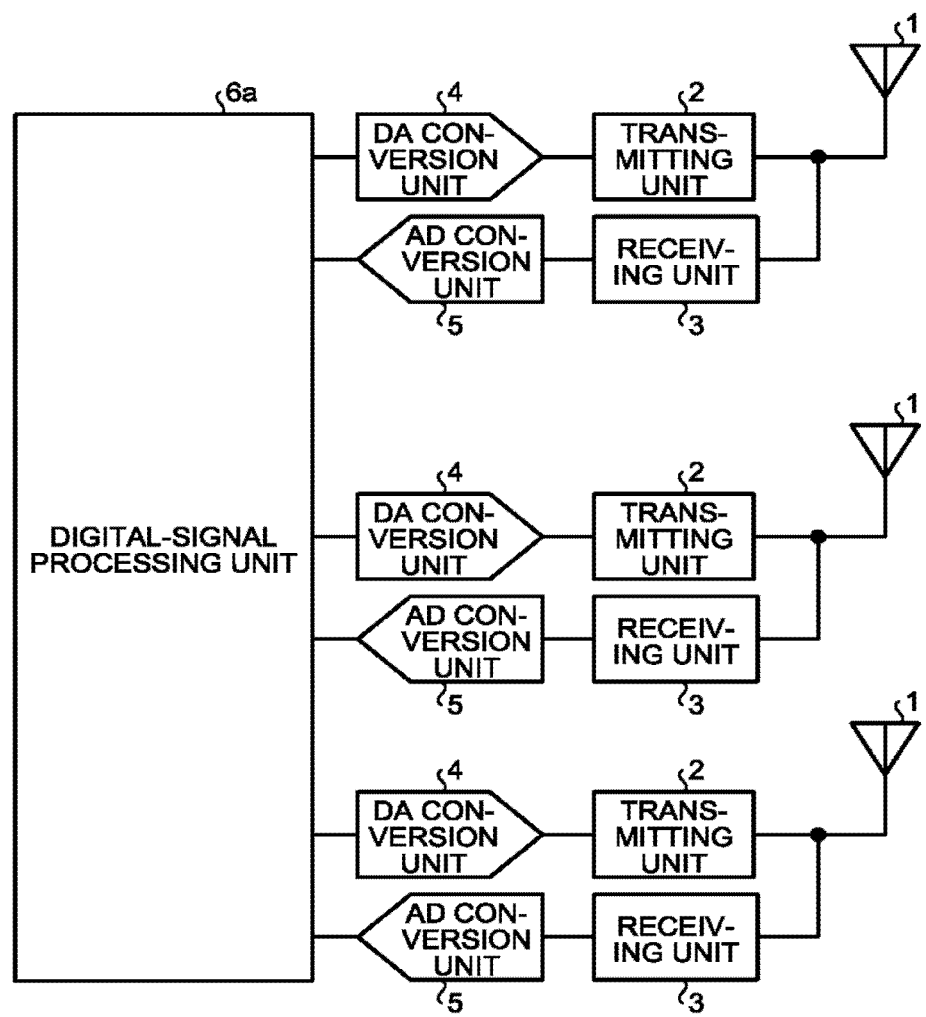
FIG. 1 is a diagram showing a wireless communication apparatus of a conventional Massive MIMO configuration.

FIG. 1 is a diagram showing a wireless communication apparatus of a conventional Massive MIMO configuration. When the wireless communication apparatus includes several to several ten antennas, as shown in FIG. 1, the wireless communication apparatus includes a transmitting unit 2, a receiving unit 3, a DA (Digital to Analog) conversion unit 4, and an AD (Analog to Digital) conversion unit 5 for each of antennas 1 and includes a digital-signal processing unit 6a adaptable to the number of the antennas 1. The wireless communication apparatus includes a series of circuits that alone is capable of transmitting and receiving signals to and from the antennas 1, that is, the transmitting unit 2, the receiving unit 3, the DA conversion unit 4, and the AD conversion unit 5. On the other hand, when the wireless communication apparatus includes one hundred to one thousand antennas, from the view point of mountability and economy, it is unrealistic to mount the series of circuits for each of the antennas 1 and mount the digital-signal processing unit 6a adaptable to the number of the antennas 1 as shown in FIG. 1.

Figure 2:
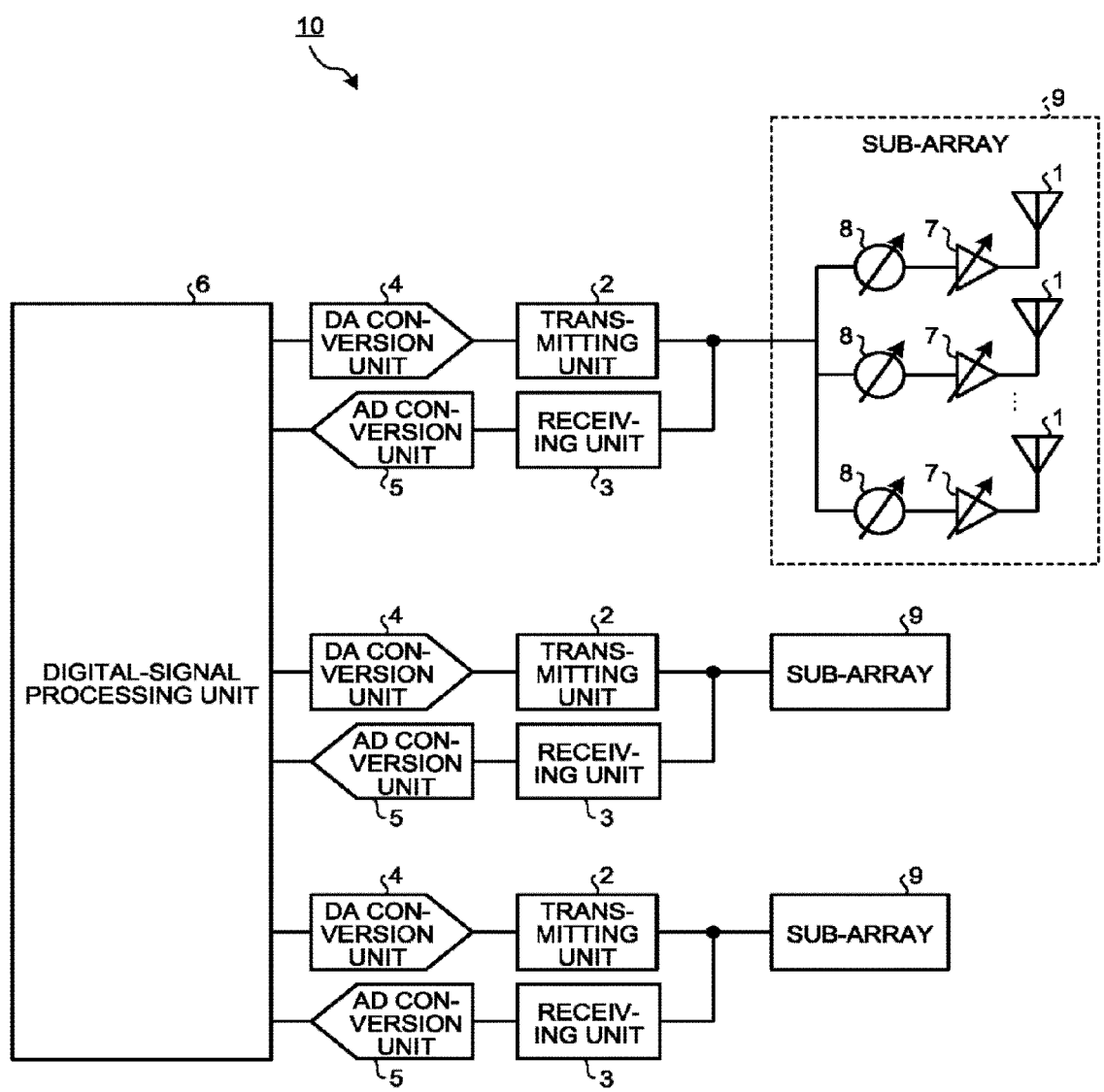
FIG. 2 is a diagram showing a configuration example of a wireless communication apparatus of a sub-array configuration according to an embodiment of the present invention.

Therefore, in the wireless communication apparatus in this embodiment, a sub-array is configured by a plurality of antennas. FIG. 2 is a diagram showing a configuration example of a wireless communication apparatus 10 of a sub-array configuration according to the embodiment of the present invention. A plurality of sets of circuits including the antennas 1, variable amplifiers 7, which are amplifiers capable of adjusting outputs, and variable phase shifters 8 capable of adjusting phases of signals are combined to configure a sub-array 9. The sub-array 9 is an analog-beam formation circuit that forms an analog beam by setting the variable amplifier 7 and the variable phase shifter 8 to a specific amplitude phase. The wireless communication apparatus 10 is an apparatus by a configuration of a sub-array type MIMO including a plurality of sub-arrays 9. For example, when the number of antennas configuring one sub-array 9 is $N_{ts}$, in the wireless communication apparatus 10, the number of the transmitting units 2, the receiving units 3, the DA conversion units 4, and the AD conversion units 5 can be set to $1/N_{ts}$ and the size of the digital-signal processing unit 6 can be set to $1/N_{ts}$.

Figure 3:
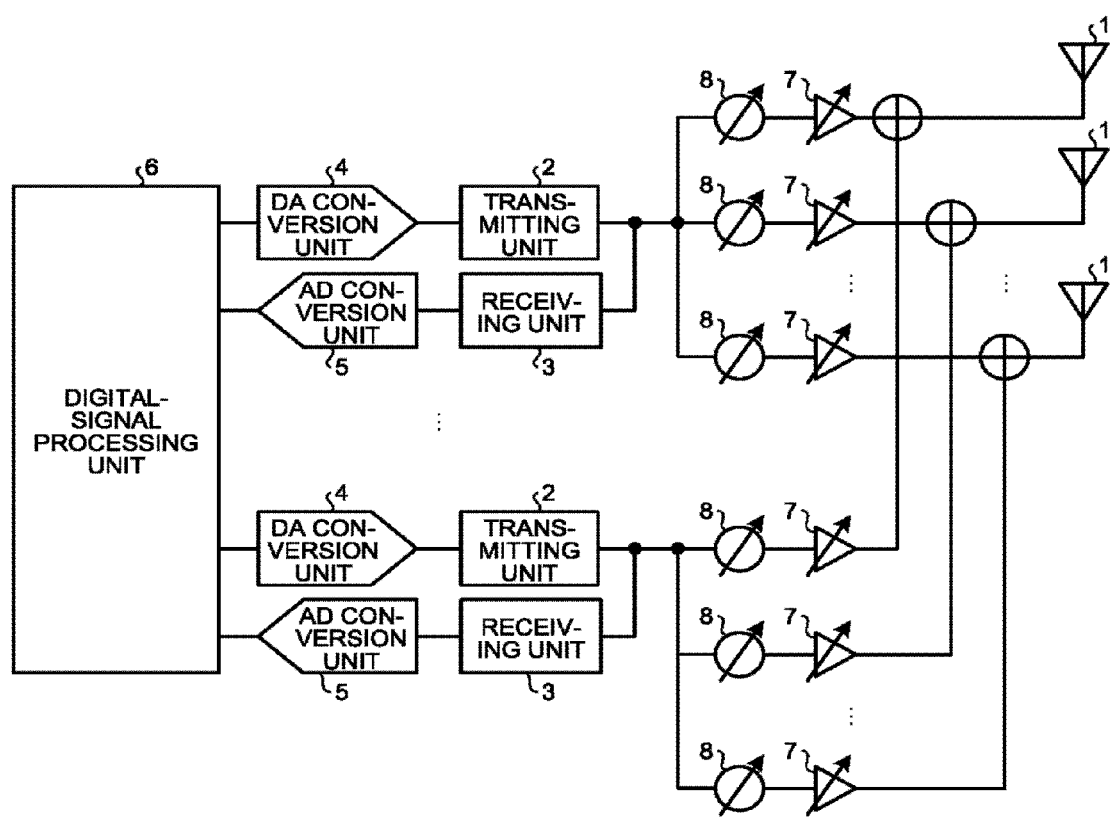
FIG. 3 is a diagram showing a configuration example of a wireless communication apparatus of a full-array configuration according to the embodiment of the present invention.

The above explanation is based on the sub-array configuration. However, as shown in FIG. 3, it is possible to apply the same system in a full-array configuration in which pluralities of transmitting sections 2, receiving sections 3, DA conversion sections 4, and AD conversion sections 5 share one antenna 1. FIG. 3 is a diagram showing a configuration example of a wireless communication apparatus of the full-array configuration according to the embodiment of the present invention.

Figure 4:
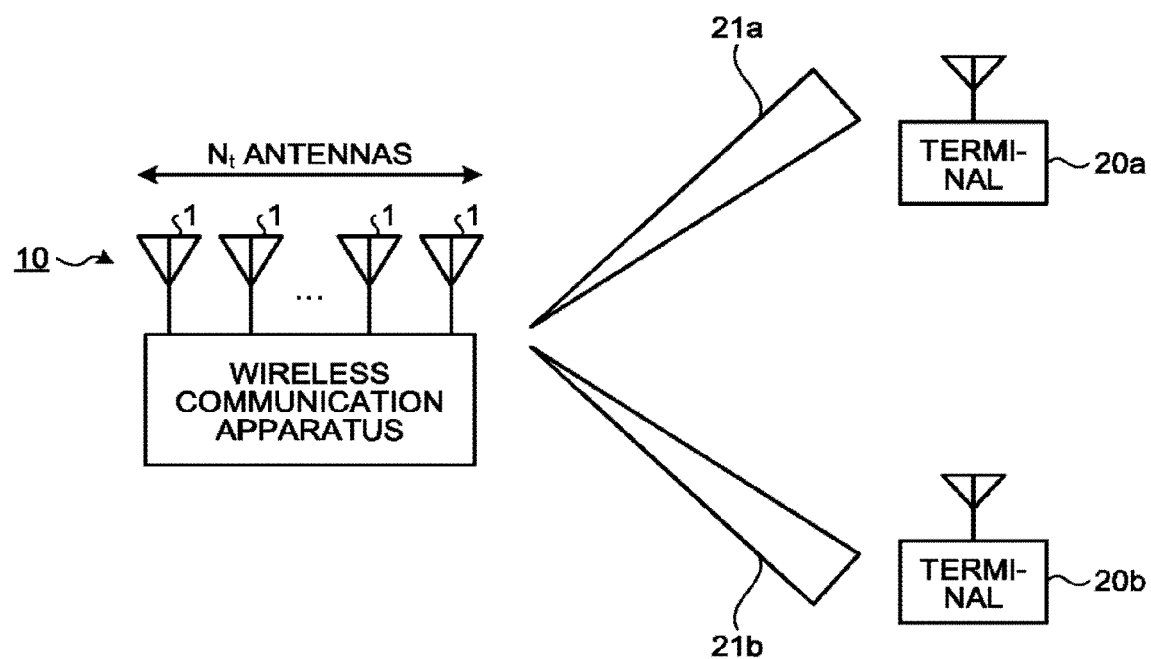
FIG. 4 is a diagram showing a configuration example of a communication system using a sub-array type MIMO.

A communication system using a sub-array type MIMO is explained. FIG. 4 is a diagram showing a configuration example of the communication system using the sub-array type MIMO. In the following explanation, the wireless communication apparatus 10 includes two sub-arrays 9. However, this is an example. The communication system is applicable to two or more any number of sub-arrays. The wireless communication apparatus 10, which is a base station, includes $N_t$ antennas 1, directs an analog beam 21a to a terminal 20a, and directs an analog beam 21b to a terminal 20b. The analog beam 21a is an analog beam formed from the sub-array 9 including nine antennas 1 and is formed to be directed to the terminal 20a. The analog beam 21b is an analog beam formed from the sub-array 9 including $N_{ts}$ antennas 1 and is formed to be directed to the terminal 20b. In FIG. 4, the number of the sub-arrays 9 is not described. However, the number of analog beams is the same as the number of the sub-arrays 9, that is, two.

Figure 5:
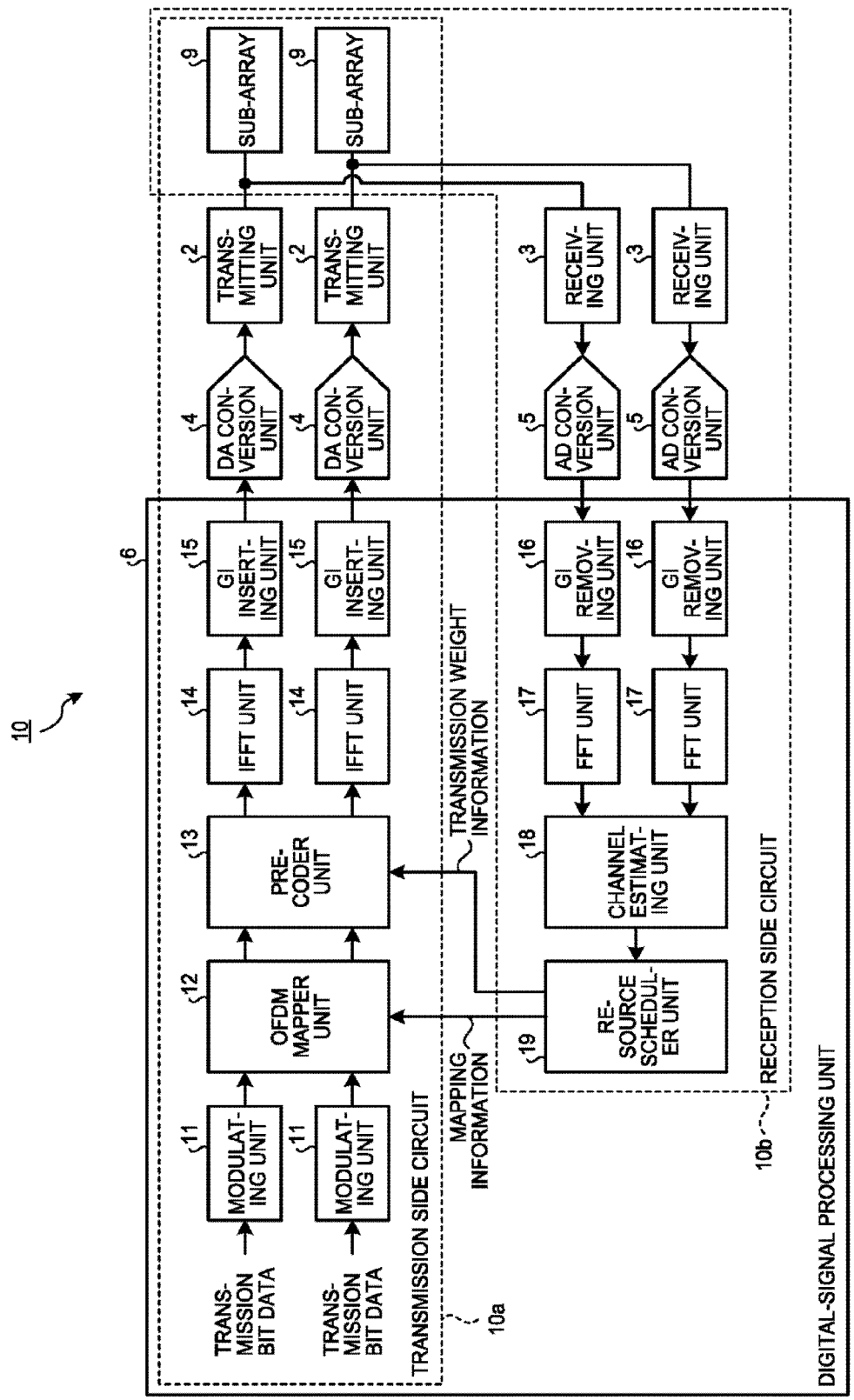
FIG. 5 is a diagram showing a circuit configuration example of the wireless communication apparatus.

FIG. 5 is a diagram showing a circuit configuration example of the wireless communication apparatus 10. The configuration shown in FIG. 5 is an example. The present invention is not limited by the number of the sub-arrays 9, processing order inside the wireless communication apparatus 10, and the like. The wireless communication apparatus 10 includes two sub-arrays 9 and $N_{ts}=N_t/2$ antennas per one sub-array. Transmission bit data is generally bit data including a parity bit after error correction encoding.

First, the operations of components on a transmission side in the wireless communication apparatus 10 are explained. The transmission side is the portion of a transmission side circuit 10a indicated by a dotted line in FIG. 5.

Modulating units 11 perform symbol mapping of transmission bit data onto an IQ plane according to a system-designated modulation system such as QPSK (Quadrature Phase Shift Keying) or QAM (Quadrature Amplitude Modulation). Two modulating units 11 perform the symbol mapping of input transmission bit data separately onto the IQ plane and output the transmission bit data to one OFDM mapper unit 12.

Figure 6:
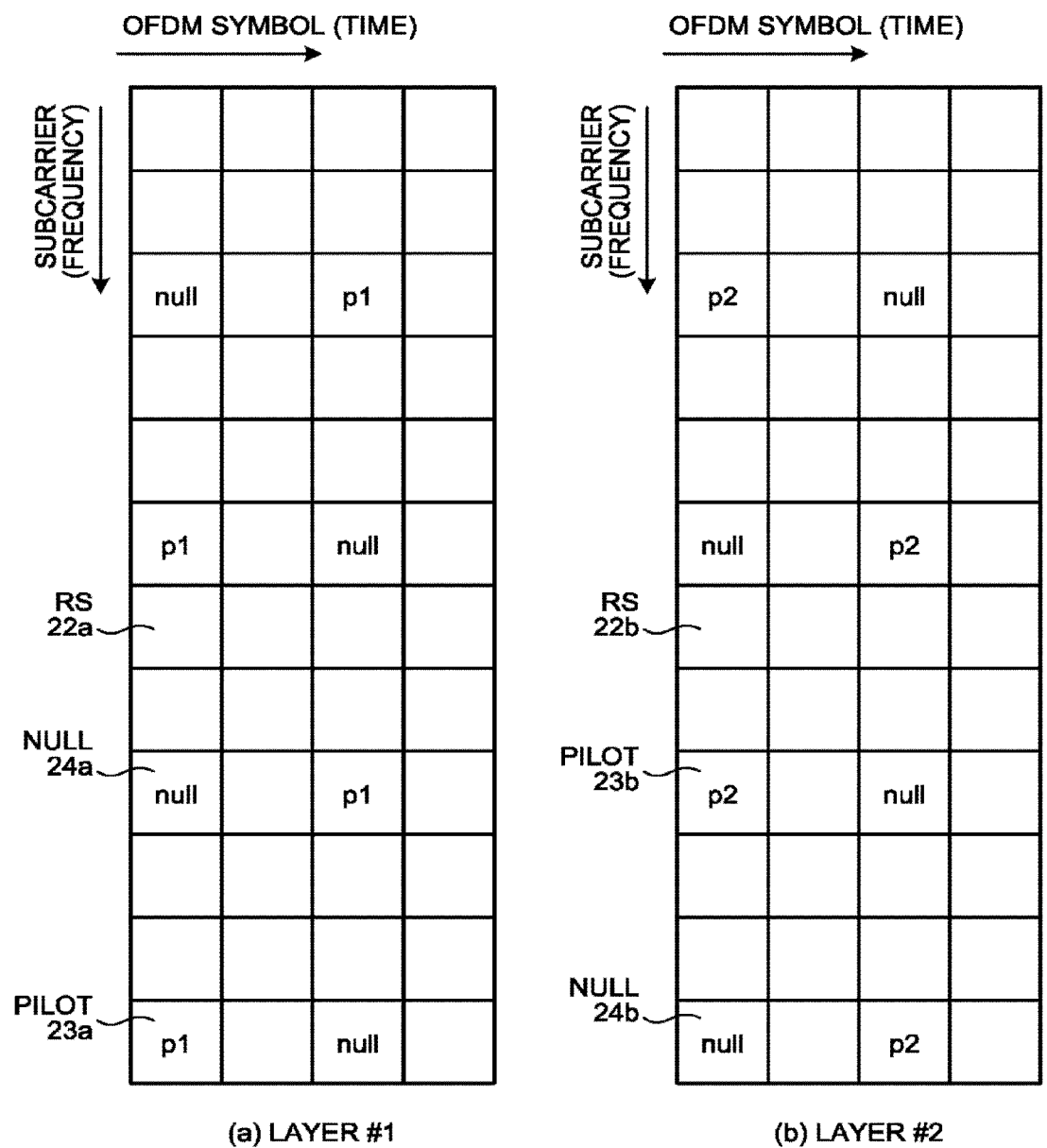
FIG. 6 is a diagram showing an example of data mapping by an OFDM mapper unit.

The OFDM mapper unit 12 is mapping means for performing data mapping of transmission signals after the symbol mapping input from the two modulating units 11 onto a frequency axis. FIG. 6 is a diagram showing an example of the data mapping by the OFDM mapper unit 12. FIG. 6(a) shows a layer #1, which is the analog beam 21a directed to the terminal 20a. FIG. 6(b) shows a layer #2, which is the analog beam 21b directed to the terminal 20b. In both of FIG. 6(a) and FIG. 6(b), the longitudinal direction is a frequency axis direction and indicates disposition of subcarriers and the lateral direction is a time axis direction and indicates disposition of OFDM symbols. The number of output ports, that is, the number of layers of the OFDM mapper unit 12 is the number of series of circuits from IFFT (Inverse Fast Fourier Transform) units 14 to the sub-array 9 and the number of analog beams that can be simultaneously formed. The number of layers is two.

RSs 22a and 22b are transmission symbols respectively mapped to the layers #1 and #2. Pilots 23a and 23b are pilot symbols respectively mapped to the layers #1 and #2. Nulls 24a and 24b are respectively null subcarriers of the layers #1 and #2. The OFDM mapper unit 12 outputs two signals after the data mapping to a pre-coder unit 13. Note that mapping information of the transmission symbols to the RSs 22a and 22b is given from a resource scheduler unit 19 explained below.

The pre-coder unit 13, which is pre-coder means, performs, concerning the two signals after the data mapping input from the OFDM mapper unit 12, a weighting operation according to Expression (1) using a weight matrix W.

$$s(t,f)=Wx(t,f) \quad (1)$$

In the expression, s(t, f) represents an output vertical vector of the pre-coder unit 13 in the number of layers dimension and x(t, f) is an output vertical vector of the OFDM mapper unit 12 in the number of layers dimension. As explained above, the number of layers is two. Elements of s(t, f) and x(t, f) are signals on the frequency axis of a t-th OFDM symbol and an f-th subcarrier. The pre-coder unit 13 outputs the signals of s(t, f) after the weighting to the different IFFT units 14 for each of the layers. Note that the weigh matrix W, which is transmission weight information, is given to each of the subcarriers from the resource scheduler unit 19 explained below.

The IFFT units 14 convert frequency domain signals, which are the signals of s(t, f) after the weighting, concerning a layer corresponding thereto input from the pre-coder unit 13 into time domain signals according to IFFT. The IFFT units 14 output the time domain signals after the conversion to GI (Guard interval) inserting units 15 of the corresponding layer.

The GI inserting units 15 copy, concerning the time domain signals input from the IFFT units 14 corresponding thereto, signals for several samples in the back of one signal block to the top of the signal block, that is, insert GIs. The GI inserting units 15 output signals after the GI insertion to the DA conversion units 4 corresponding thereto.

The DA conversion units 4 convert digital signals, which are the signals after the GI insertion, input from the GI inserting units 15 corresponding thereto into analog signals. The DA conversion units 4 output the analog signals after the conversion to the transmitting units 2 corresponding thereto.

The transmitting units 2 perform, concerning the analog signals input from the DA conversion units 4 corresponding thereto, transmission processing such as up-convert and transmit signals from the sub-arrays 9 corresponding thereto.

The transmission side circuit 10a includes one OFDM mapper unit 12 and one pre-coder unit 13 and includes two modulating units 11, two IFFT units 14, two GI inserting units 15, two DA conversion units 4, two transmitting units 2, and two sub-arrays 9 corresponding to the number of layers. Note that the sub-arrays 9 are shared by a reception side circuit 10b explained below.

The operations of components on a reception side in the wireless communication apparatus 10 are explained. The components on the reception side are the portion of the reception side circuit 10b indicated by a dotted line in FIG. 5. The sub-arrays 9 are components common to the transmission side circuit 10a and the reception side circuit 10b. In the case of a TDD (Time Division Duplex) system, transmission and reception of the sub-arrays 9 are switched in a time division manner by a not-shown control unit.

The receiving units 3 perform reception processing such as down-convert concerning reception signals received by the sub-arrays 9 corresponding thereto and output the reception signals to the AD conversion units 5 corresponding thereto.

The AD conversion units 5 sample input signals input from the receiving units 3 corresponding thereto and convert analog signals into digital signals. The AD conversion units 5 output the digital signals after the conversion to the GI removing units 16 corresponding thereto.

The GI removing units 16 remove GIs inserted by terminals on the transmission side from the digital signals input from the AD conversion units 5 corresponding thereto and create time domain signals. The GI removing units 16 output the time domain signals to FFT units 17 corresponding thereto.

The FFT units 17 convert the time domain signals input from the GI removing units 16 corresponding thereto into frequency domain signals according to FFT. The FFT units 17 output the frequency domain signals after the conversion to one channel estimating unit 18.

Figure 7:
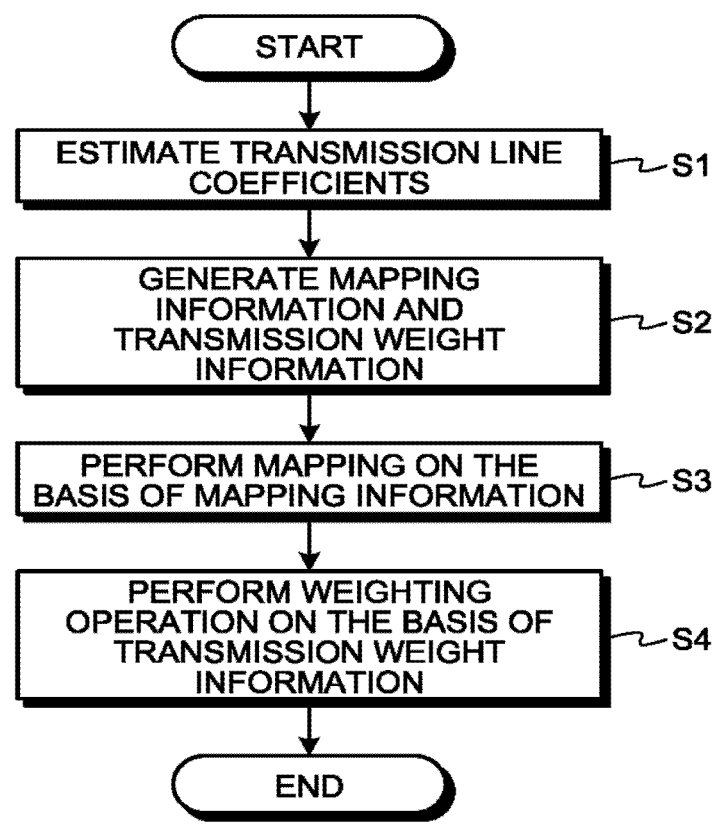
FIG. 7 is a flowchart showing processing for selecting an allocation system for OFDM symbols on the basis of a transmission line coefficient in the wireless communication apparatus.

The subsequent processing is explained with reference to a flowchart. FIG. 7 is a flowchart showing processing for selecting an allocation system for OFDM symbols on the basis of a transmission line coefficient in the wireless communication apparatus 10.

The channel estimating unit 18, which is channel estimating means, estimates transmission line coefficients from the terminal 20a to the two sub-arrays 9 or the two AD conversion units 5 and transmission line coefficients from the terminal 20b to the two sub-arrays 9 or the two AD conversion units 5 (step S1). The transmission line coefficients are information indicating situations of transmission lines, which are channels, between the terminals 20a and 20b and the sub-arrays 9. The transmission line coefficients can be information indicating gains of the transmission lines but are not limited to this. The channel estimating unit 18 estimates transmission line coefficients for each of subcarriers using pilot signals included in the OFDM symbols.

When a transmission frame configuration from the terminals 20a and 20b is equivalent to the configuration shown in FIG. 6, the channel estimating unit 18 estimates and interpolates, using transmission line coefficients of a plurality of subcarriers, in which the pilots 23a and 23b are disposed, transmission line coefficients of other subcarriers, in which the pilots 23a and 23b are not disposed, to calculate transmission line coefficients of all the subcarriers. A method of the estimation and the interpolation can be a conventional method and is not limited to a specific method in this embodiment. The channel estimating unit 18 outputs the estimated transmission line coefficients to the resource scheduler unit 19.

The resource scheduler unit 19 generates mapping information and transmission weight information of OFDM symbols, which are transmission symbols, using the transmission line coefficients input from the channel estimating unit 18 (step S2).

Figure 8:
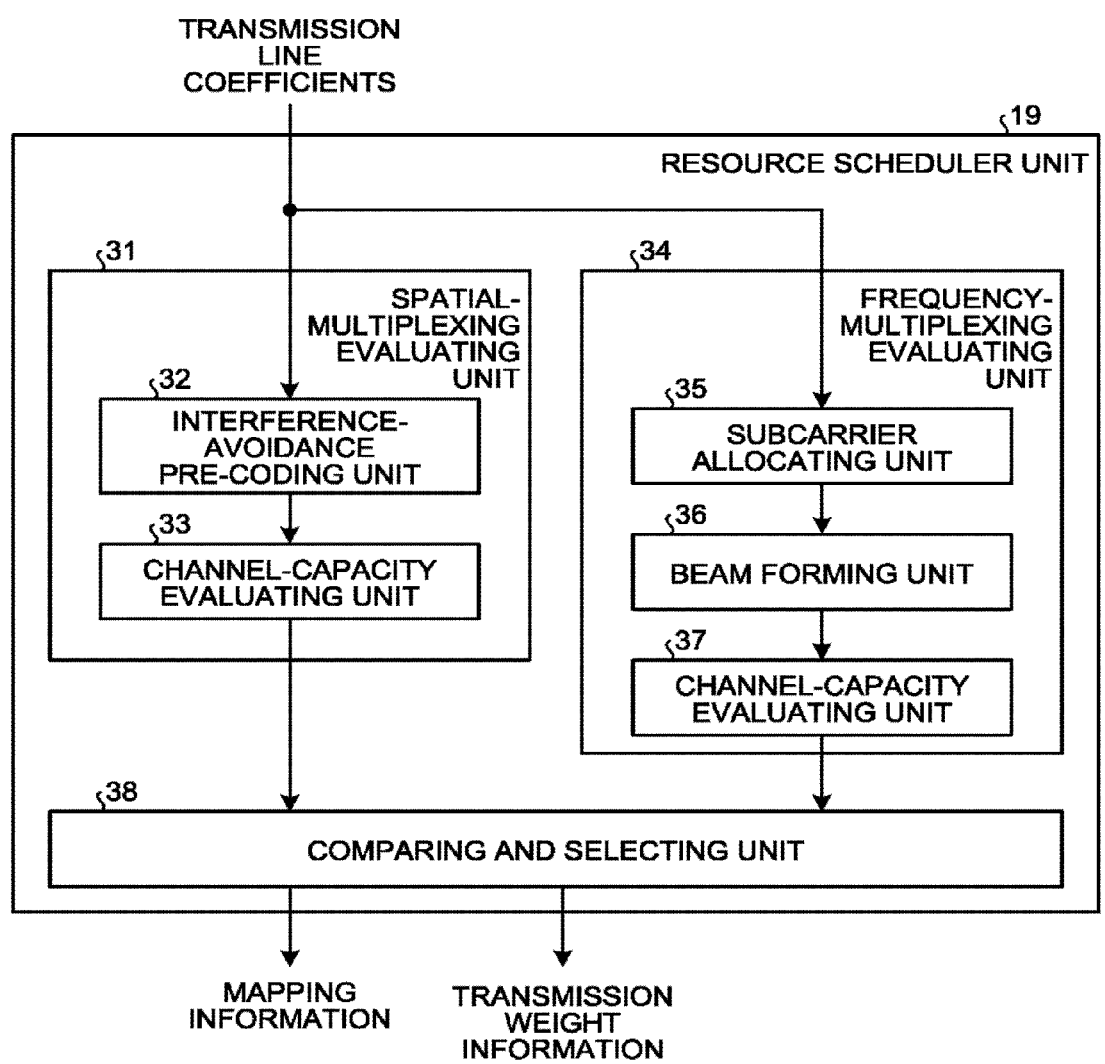
FIG. 8 is a diagram showing a configuration example of a resource scheduler unit.

FIG. 8 is a diagram showing a configuration example of the resource scheduler unit 19. The resource scheduler unit 19 is resource scheduler means for generating, using the transmission line coefficients from the channel estimating unit 18, mapping information and transmission weight information at the time when a transmission method by spatial multiplexing and mapping information and transmission weight information at the time when a transmission method by frequency multiplexing and selecting and outputting the mapping information and the transmission weight information by one of the multiplexing systems.

Figure 9:
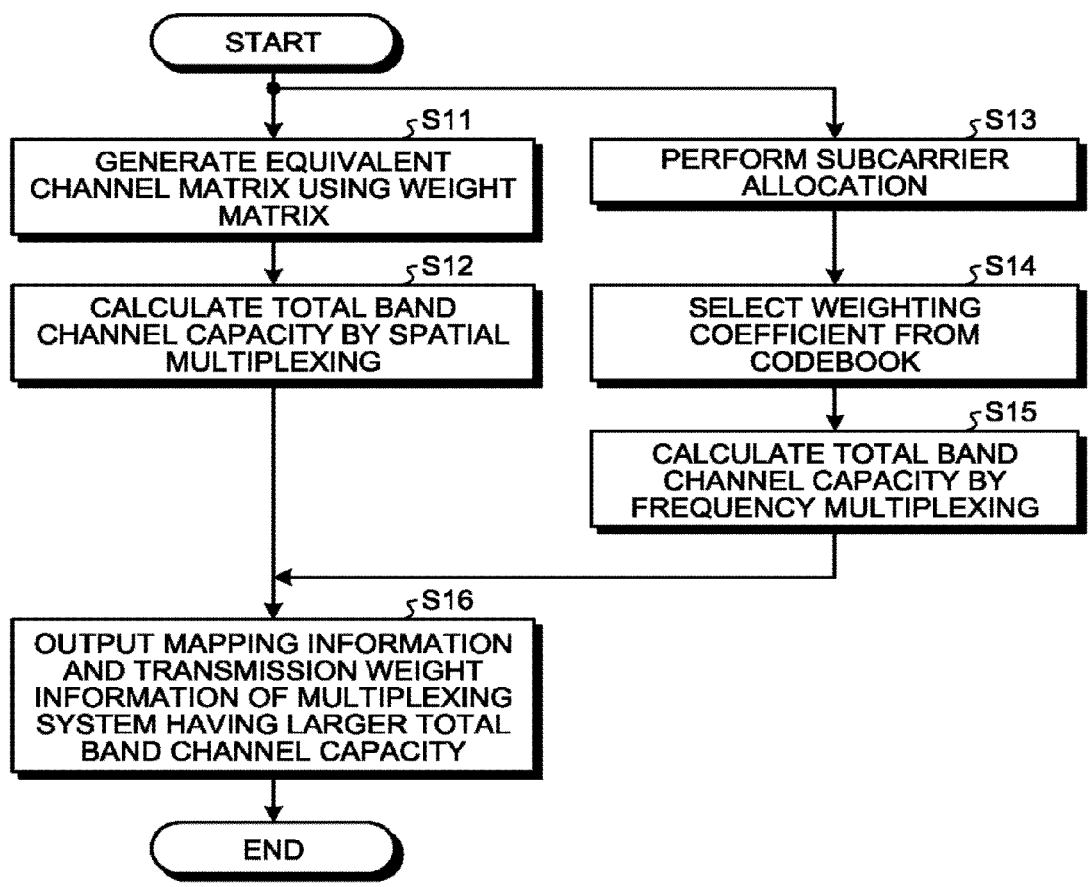
FIG. 9 is a flowchart showing processing for selecting and outputting mapping information and transmission weight information in the resource scheduler unit.

The processing of the resource scheduler unit 19 shown at step S2 of FIG. 7 is explained in detail with reference to a flowchart of FIG. 9. FIG. 9 is a flowchart showing processing for selecting and outputting the mapping information and the transmission weight information in the resource scheduler unit 19.

Figure 10:
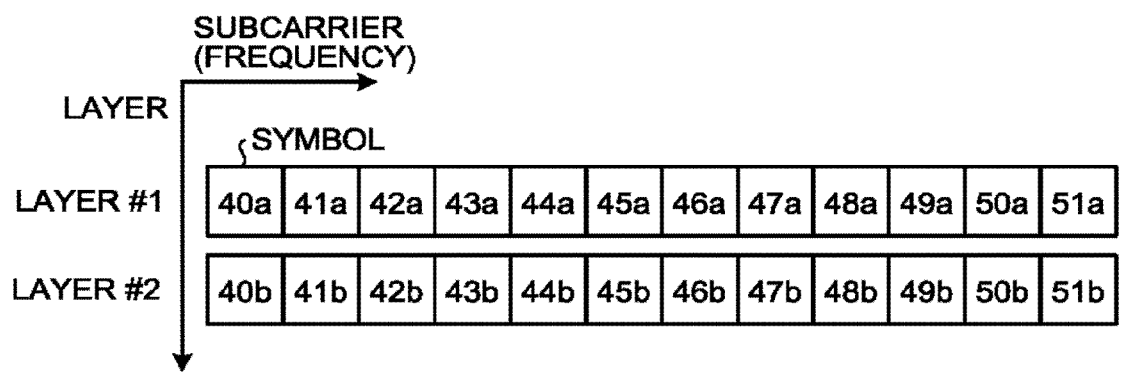
FIG. 10 is a diagram showing allocation of subcarriers in layers in the case of spatial multiplex transmission.

First, the operation of a spatial-multiplexing evaluating unit 31, which is spatial-multiplexing evaluating means, is explained. FIG. 10 is a diagram showing allocation of subcarriers in layers in the case of spatial multiplex transmission. As shown in FIG. 10, the spatial-multiplexing evaluating unit 31 allocates symbols addressed to a plurality of terminals, that is, different symbols to subcarriers having the same frequency in the layers and evaluates a transmission system for spatial multiplexing. Symbols 40a to 51a of the layer #1, which is the analog beam 21a, are symbols addressed to the terminal 20a. Symbols 40b to 51b of the layer #2, which is the analog beam 21b, are symbols addressed to the terminal 20b.

First, concerning the layers, as shown in FIG. 10, an interference-avoidance pre-coding unit 32, which is interference-avoidance pre-coding means, performs subcarrier allocation for simultaneously transmitting signals addressed to a plurality of terminals to a plurality of terminals 20a and 20b in the same time and at the same frequency. Subsequently, when the number of terminals is two, the interference-avoidance pre-coding unit 32 carries out, using the transmission line coefficients estimated by the channel estimating unit 18, digital pre-coding for special multiplexing specified for a communication system including the wireless communication apparatus 10 and the terminals 20a and 20b and generates an equivalent channel matrix after the pre-coding. For example, a MIMO channel matrix H is defined by Expression (2).

[Math 1]

$$H = \begin{bmatrix} h_{11} & h_{12} \\ h_{21} & h_{22} \end{bmatrix} \quad (2)$$

In Expression (2), $h_{ij}$ represents a transmission line coefficient between an i-th user and a j-th sub-array. When Zero-Forcing is applied, a weight matrix W of the digital pre-coding can be represented by Expression (3).

[Math 2]

$$W = \frac{1}{\gamma}\left(H^H(HH^H)^{-1}\right) \quad (3)$$

In this case, an equivalent channel matrix $H_e$ is "$H_e = HW$". Note that, in Expression (3), γ represents a coefficient for fixing total transmission power. The interference-avoidance pre-coding unit 32 generates the equivalent channel matrix $H_e$ using the weight matrix W of the digital pre-coding (step S11).

Because elements on diagonal lines of the equivalent channel matrix $H_e$ are desired signals, when electric powers of the elements on diagonal lines are represented as P1 and P2 and noise power of the receiving unit 3 is represented as $\sigma^2$, a channel-capacity evaluating unit 33, which is spatial-multiplexing-channel-capacity evaluating means, calculates a channel capacity C according to Expression (4).

$$C = \log 2(1+P_1/\sigma^2) + \log 2(1+P_2/\sigma^2) \quad (4)$$

Expression (4) represents the channel capacity C at the time when the number of terminals is two. However, the channel capacity C at the time when the number of terminals is N can be represented by Expression (5).

[Math 3]

$$C = \Sigma_{k=1}^{N} \log 2(1+P_k) \quad (5)$$

Further, when the channel capacity C of a p-th subcarrier is represented as $C_{p\_sdm}$ and the number of subcarriers is represented as $N_{SC}$, the channel-capacity evaluating unit 33 calculates a total band channel capacity $C_{all\_sdm}$ by spatial multiplexing according to Expression (6) (step S12).

[Math 4]

$$C_{all\_sdm} = \sum_{p=1}^{N_{SC}} C_{p\_sdm} \quad (6)$$

Note that, in the channel-capacity evaluating unit 33, a calculation method for the total band channel capacity $C_{all\_sdm}$ is an example. The channel-capacity evaluating unit 33 can calculate a total band channel capacity according to other calculation methods.

The channel-capacity evaluating unit 33 outputs, to a comparing and selecting unit 38, the calculated total band channel capacity $C_{all\_sdm}$, subcarrier allocation for achieving the total band channel capacity $C_{all\_sdm}$ generated by the interference-avoidance pre-coding unit 32, and the weight matrix W of the pre-coding in the subcarriers generated by the interference-avoidance pre-coding unit 32. Note that the subcarrier allocation for achieving the total band channel capacity $C_{all\_sdm}$ means the subcarrier allocation shown in FIG. 10.

Figure 11:
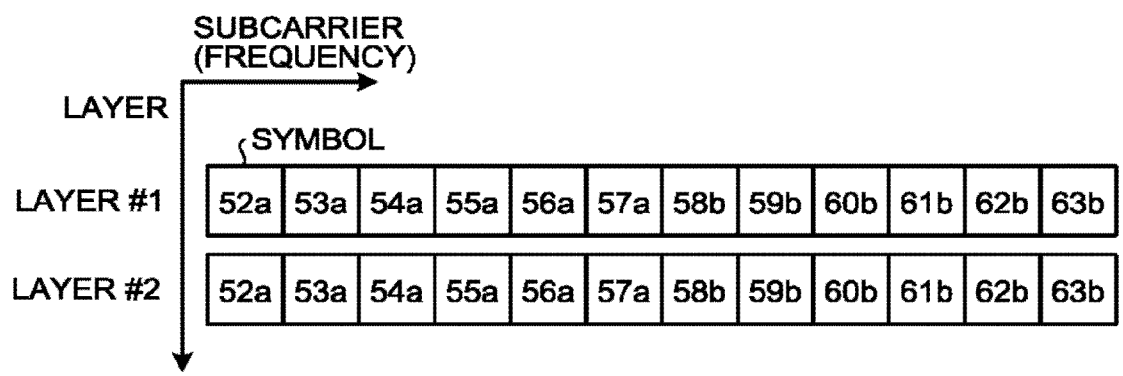
FIG. 11 is a diagram showing allocation of subcarriers in layers in the case of frequency multiplex transmission.

The operation of a frequency-multiplexing evaluating unit 34, which is frequency-multiplexing evaluating means, is explained. FIG. 11 is a diagram showing allocation of subcarriers in layers in the case of frequency multiplexing transmission. As shown in FIG. 11, a subcarrier allocating unit 35, which is subcarrier allocating means, performs subcarrier allocation for allocating the same symbol to subcarriers having the same frequency in the layer #1 and the layer #2 (step S13). That is, frequency multiplexing is performed and spatial multiplexing is not performed. Symbols 52a to 57a are symbols addressed to the terminal 20a. Symbols 58b to 63b are symbols addressed to the terminal 20b. Signals addressed to a plurality of terminals are simultaneously transmitted to the plurality of terminals in different subcarriers. The subcarrier allocating unit 35 can compare gains of transmission line coefficients of the terminals 20a and 20b for each of the subcarriers and allocate data addressed to the terminal having a higher gain of the transmission line coefficient. However, this is an example. Other allocation methods can be used.

A beam forming unit 36 is weighting-coefficient selecting means for allocating, out of a codebook, an appropriate weighting coefficient for each of subcarriers or weighting-coefficient generating means for generating a weighting coefficient on the basis of a transmission line coefficient. The codebook is a weighting coefficient group for the same symbol allocated to different layers in the same subcarrier. For example, a codebook including L weighting coefficients is $W_{CB} = [W_{CB\_1}, W_{CB\_2}, \ldots, W_{CB\_L}]$, where $W_{CB\_k} = [W_{CB\_k\_1}, W_{CB\_k\_2}]^T$ and $W_{CB\_k\_j}$ is a complex number. $[\;]^T$ indicates transposition. When a symbol allocated to the layers #1 and #2 of the subcarrier put in the subcarrier allocating unit 35 is represented as S and transmission line coefficients from the analog beams 21a and 21b of the subcarrier to a destination terminal of the symbol are represented as $h=[h_1, h_2]$, the beam forming unit 36 selects, according to Expression (7), from the codebook, a weighting coefficient with which maximum power $P_{max}$ is obtained (step S14). Because a transmission line coefficient and a destination terminal of a symbol are different for each of the subcarriers, a weighting coefficient is also different for each of the subcarriers.

[Math 5]

$$P_{max} = \max_{k=1 \sim L} \left( \left( h \; w_{CB\_k} \begin{bmatrix} s \\ s \end{bmatrix} \right) \left( h \; w_{CB\_k} \begin{bmatrix} s \\ s \end{bmatrix} \right)^* \right) \quad (7)$$

When weighting coefficient is generated, maximum ratio synthesis is performed as indicated by Expression (8) using the transmission line coefficient $h=[h_1, h_2]$ from the analog beams 21a and 21b of the subcarrier to the destination terminal of the symbol. In the expression, $(\bullet)^*$ indicates complex conjugate.

[Math 6]

$$W_{GEN} = \frac{1}{\sqrt{|h_1|+|h_2|}}[h_1^*, h_2^*] \quad (8)$$

A channel-capacity evaluating unit 37, which is frequency-multiplexing-channel-capacity evaluating means, calculates the channel capacity C using Expression (9) according to the maximum power $P_{max}$ obtained from the weighting coefficient in the codebook selected by the beam forming unit 36.

$$C = \log 2(1 + P_{max}/\sigma^2) \quad (9)$$

The frequency-multiplexing evaluating unit 34 carries out, by the number of subcarriers, processing using Expression (7) by the beam forming unit 36 and Expression (9) by the channel-capacity evaluating unit 37. The channel-capacity evaluating unit 37 calculates a total channel capacity of all the subcarriers. When the channel capacity C of a p-th subcarrier is represented as $C_{p\_fdm}$ and the number of subcarriers is represented as $N_{SC}$, the channel-capacity evaluating unit 37 calculates a total band channel capacity $C_{all\_fdm}$ by frequency multiplexing according to Expression (10) (step S15).

[Math 7]

$$C_{all\_fdm} = \sum_{p=1}^{N_{SC}} C_{p\_fdm} \quad (10)$$

Note that, in the channel-capacity evaluating unit 37, a calculation method for the total band channel capacity $C_{all\_fdm}$ is an example. A total band channel capacity can be calculated by other calculation methods.

The channel-capacity evaluating unit 37 outputs, to the comparing and selecting unit 38, the calculated total band channel capacity $C_{all\_fdm}$, subcarrier allocation for achieving the total band channel capacity $C_{all\_fdm}$ generated by the subcarrier allocating unit 35, and the weighting coefficients in the codebook in the subcarriers generated by being selected in the beam forming unit 36. The subcarrier allocation for achieving the total band channel capacity $C_{all\_fdm}$ means the subcarrier allocation shown in FIG. 11.

The comparing and selecting unit 38, which is comparing and selecting means, compares the total band channel coefficient $C_{all\_fdm}$ in the case of the spatial multiplexing, which is the output from the channel-capacity evaluating unit 33, and the total band channel capacity $C_{all\_fdm}$ in the case of the frequency multiplexing, which is the output from the channel-capacity evaluating unit 37. The comparing and selecting unit 38 sets, as mapping information, the subcarrier allocation by the multiplexing system having a larger total band channel capacity and outputs the mapping information to the OFDM mapper unit 12. The comparing and selecting unit 38 sets, as transmission weight information, the weight matrix W of the pre-coding or the weighting coefficient in the codebook by the multiplexing system having the larger total band channel capacity and outputs the transmission weight information to the pre-coder unit 13 (step S16).

The reception side circuit 10b includes one channel estimating unit 18 and one resource scheduler unit 19 and includes two sub-arrays 9, two receiving units 3, two AD conversion units 5, two GI removing units 16, and two FFT units 17 corresponding to the number of layers. Note that, as explained above, the sub-arrays 9 are common to the transmission side circuit 10a.

Referring back to the flowchart of FIG. 7, the OFDM mapper unit 12 maps, on the basis of the mapping information input and given from the comparing and selecting unit 38 of the resource scheduler unit 19, the transmission symbols after the symbol mapping input from the two modulating units 11 on a frequency axis (step S3). The pre-coder unit 13 performs, on the basis of the transmission weight information input and given from the comparing and selecting unit 38 of the resource scheduler unit 19, a weighting operation concerning the two signals after the data mapping input from the OFDM mapper unit 12 (step S4).

Consequently, in the wireless communication apparatus 10 that forms a digital beam using the two analog beams 21a and 21b, it is possible to select, on the basis of transmission line situations between the wireless communication apparatus 10 and the terminals 20a and 20b, an allocation system for OFDM symbols, that is, the spatial multiplexing shown in FIG. 10 or the frequency multiplexing shown in FIG. 11.

In the past, digital beam formation by a digital circuit is formation of a different beam for each of subcarriers, that is, beam formation on a frequency axis. Therefore, it is possible to obtain a frequency diversity effect by allocating a plurality of terminals on the frequency axis. On the other hand, analog beam formation by an analog circuit is beam formation with the same weighting for all the subcarriers. Therefore, only one user can be allocated per one OFDM symbol. In the analog beam formation, even if there is a subcarrier with a low transmission line gain because of frequency selectivity, unlike the digital beam formation, the subcarriers cannot be allocated to other terminals and the frequency diversity effect cannot be obtained.

In this embodiment, the wireless communication apparatus 10 forms a digital beam using two or more analog beams on the basis of a terminal distribution and a transmission line situation of each of terminals. In particular, in the frequency multiplexing, on the analog beams, the frequency diversity effect is obtained by further forming a digital beam. When terminal positions are close and the terminals cannot be spatially separated, the user diversity can be obtained even in the analog beams.

Note that, in the explanation of the flowchart of FIG. 9, the operation of the frequency-multiplexing evaluating unit 34 is explained after the explanation of the operation of the spatial-multiplexing evaluating unit 31. However, in the resource scheduler unit 19, it is possible to reduce a processing time until the output of the mapping information and the transmission weight information by performing the operations of the spatial-multiplexing evaluating unit 31 and the frequency-multiplexing evaluating unit 34 in parallel. In FIG. 9, the processing at step S11 by the interference-avoidance pre-coding unit 32 and the processing at step S12 by the channel-capacity evaluating unit 33 can be collectively performed as a spatial-multiplexing evaluating step by the spatial-multiplexing evaluating unit 31. Similarly, in FIG. 9, the processing at step S13 by the subcarrier allocating unit 35, the processing at step S14 by the beam forming unit 36, and the processing at step S15 by the channel-capacity evaluating unit 37 can be collectively performed as a frequency-multiplexing evaluating step by the frequency-multiplexing evaluating unit 34.

As explained above, according to this embodiment, in the wireless communication apparatus 10 including the two or more sub-arrays 9 including the antennas 1, the channel estimating unit 18 estimates transmission line coefficients concerning the transmission lines between the communication target terminals 20a and 20b and the sub-arrays 9. The resource scheduler unit 19 generates, on the basis of the transmission line coefficients, the mapping information of the transmission symbols by the spatial multiplexing and the frequency multiplexing and the transmission weight information used for the weighting operation to the signals after the mapping, selects the mapping information and the transmission weight information by one of the multiplexing systems, outputs the selected mapping information to the OFDM mapper unit 12, and outputs the selected transmission weight information to the pre-coder unit 13. Consequently, the wireless communication apparatus 10 can adaptively select the spatial multiplexing and the frequency multiplexing and transmit the signals on the basis of the situations of the transmission lines between the wireless communication apparatus 10 and the terminals 20a and 20b.

The configuration explained above in the embodiment indicates an example of the content of the present invention. The configuration can also be combined with other publicly-known technologies. A part of the configuration can also be omitted or changed in a range not departing from the gist of the present invention.

The hardware configuration of the wireless communication apparatus 10 is explained. In the wireless communication apparatus 10, the modulating unit 11 is realized by a modulator. The IFFT unit 14 is realized by an IFFT circuit. The GI inserting unit 15 is realized by a GI insertion circuit. The DA conversion unit 4 is realized by a DA converter. The transmitting unit 2 and the receiving unit 3 are realized by an interface circuit such as an interface card of wireless communication. The sub-array 9 is realized by an antenna element, a variable amplifier, and a variable phase shifter. The AD conversion unit 5 is realized by an AD converter. The GI removing unit 16 is realized by a GI removal circuit. The FFT unit 17 is realized by an FFT circuit. In the following explanation, among the components of the wireless communication apparatus 10, the portions of the OFDM mapper unit 12, the pre-coder unit 13, the channel estimating unit 18, and the resource scheduler unit 19 are explained.

In the wireless communication apparatus 10, the functions of the OFDM mapper unit 12, the pre-coder unit 13, the channel estimating unit 18, and the resource scheduler unit 19 are realized by a processing circuit. That is, the wireless communication apparatus 10 includes a processing circuit for estimating a transmission line coefficient, generating mapping information and transmission weight information using the transmission line coefficient, mapping transmission symbols on a frequency axis on the basis of the mapping information, and performing a weighting operation concerning a signal after data mapping on the basis of the transmission weight information. The processing circuit can be dedicated hardware or can be a CPU (Central Processing Unit), which executes a program stored in a memory, and the memory.

Figure 12:
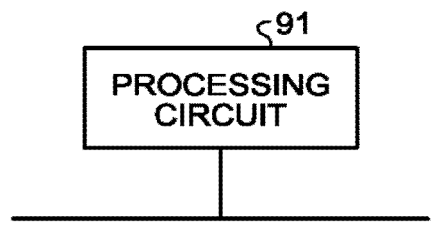
FIG. 12 is a diagram showing an example in which a processing circuit of the wireless communication apparatus is configured by dedicated hardware.

FIG. 12 is a diagram showing an example in which the processing circuit of the wireless communication apparatus 10 according to this embodiment is configured by the dedicated hardware. When the processing circuit is the dedicated hardware, a processing circuit 91 shown in FIG. 12 corresponds to, for example, a single circuit, a complex circuit, a programmed processor, a parallel-programmed processor, an ASIC, an FPGA, or a combination of the foregoing. The functions of the OFDM mapper unit 12, the pre-coder unit 13, the channel estimating unit 18, and the resource scheduler unit 19 can be individually realized by the processing circuit 91 or the functions of the units can be collectively realized by the processing circuit 91.

Figure 13:
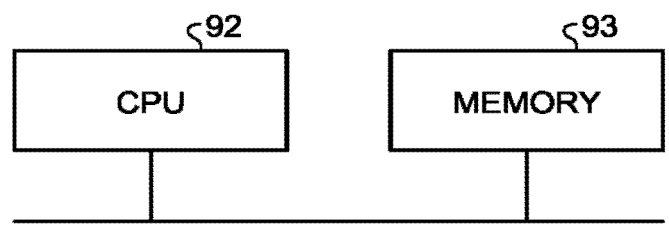
FIG. 13 is a diagram showing an example in which the processing circuit of the wireless communication apparatus is configured by a CPU and a memory.

FIG. 13 is a diagram showing an example in which the processing circuit of the wireless communication apparatus 10 according to this embodiment is configured by the CPU and the memory. When the processing circuit is configured by a CPU 92 and a memory 93, the functions of the OFDM mapper unit 12, the pre-coder unit 13, the channel estimating unit 18, and the resource scheduler unit 19 are realized by software, firmware, or a combination of the software and the firmware. The software or the firmware is described as a program and stored in the memory 93. In the processing circuit, the CPU 92 reads out and executes the program stored in the memory 93 to thereby realize the functions of the units. That is, when the program is executed by the processing circuit, the wireless communication apparatus 10 includes the memory 93 for storing a program for resultantly executing a step of estimating a transmission line coefficient, a step of generating mapping information and transmission weight information of transmission symbols using the transmission line coefficient, a step of mapping the transmission symbols on a frequency axis on the basis of the mapping information, and a step of performing a weighting operation concerning a signal after data mapping on the basis of the transmission weight information. These programs can be considered programs for causing a computer to execute the procedures and the methods of the OFDM mapper unit 12, the pre-coder unit 13, the channel estimating unit 18, and the resource scheduler unit 19. The CPU 92 can be a central processing unit, a processing unit, an arithmetic unit, a microprocessor, a microcomputer, a processor, a DSP (Digital Signal Processor), or the like. The memory 93 corresponds to, for example, a nonvolatile or volatile semiconductor memory such as a RAM (Random Access Memory), a ROM (Read Only Memory), a flash memory, an EPROM (Erasable Programmable ROM), or an EEPROM (Electrically EPROM), a magnetic disk, a flexible disk, an optical disk, a compact disk, a minidisk, or a DVD (Digital Versatile Disc).

Note that a part of the functions of the OFDM mapper unit 12, the pre-coder unit 13, the channel estimating unit 18, and the resource scheduler unit 19 can be realized by dedicated hardware and a part of the functions can be realized by software or firmware. For example, the functions of the OFDM mapper unit 12 and the pre-coder unit 13 can be realized by the processing circuit 91 functioning as the dedicated hardware. The functions of the channel estimating unit 18 and the resource scheduler unit 19 can be realized by the CPU 92 reading out and executing the program stored in the memory 93.

In this way, the processing circuit can realize the functions with hardware, software, firmware, or a combination thereof.

REFERENCE SIGNS LIST 1 antenna
2 transmitting unit
3 receiving unit
4 DA conversion unit
5 AD conversion unit
6, 6a digital-signal processing unit
7 variable amplifier
8 variable phase shifter
9 sub-array
10 wireless communication apparatus
10a transmission side circuit
10b reception side circuit
11 modulating unit
12 OFDM mapper unit
13 pre-coder unit
14 IFFT unit
15 GI inserting unit
16 GI removing unit
17 FFT unit
18 channel estimating unit
19 resource scheduler unit
20a, 20b terminal
31 spatial-multiplexing evaluating unit
32 interference-avoidance pre-coding unit
33 channel-capacity evaluating unit
34 frequency-multiplexing evaluating unit
35 subcarrier allocating unit
36 beam forming unit
37 channel-capacity evaluating unit
38 comparing and selecting unit

The invention claimed is:

1. A wireless communication apparatus including a plurality of analog-beam formation circuits including pluralities of antennas, the wireless communication apparatus comprising:
a channel estimator to estimate transmission line coefficients indicating situations of transmission lines, which are channels between communication target terminals and the analog beam formation circuits;
a resource scheduler to generate, on the basis of the transmission line coefficients, mapping information of transmission symbols by spatial multiplexing and transmission weight information used for a weighting operation to a signal after mapping, generate mapping information and transmission weight information by frequency multiplexing, and select and output the mapping information and the transmission weight information by one of the spatial multiplexing and the frequency multiplexing;
a symbol mapper to map the transmission symbols on a frequency axis on the basis of the mapping information from the resource scheduler; and
a pre-coder to perform, on the basis of the transmission weight information from the resource scheduler, a weighting operation concerning the signal mapped by the symbol mapper.

2. The wireless communication apparatus according to claim 1, wherein
the resource scheduler includes:
a spatial-multiplexing evaluator to generate mapping information and transmission weight information by the spatial multiplexing on the basis of the transmission line coefficients and calculate a total band channel capacity by the spatial multiplexing;
a frequency-multiplexing evaluator to generate mapping information and transmission weight information by the frequency multiplexing on the basis of the transmission line coefficients and calculate a total band channel capacity by the frequency multiplexing; and a processor to compare the total band channel capacity by the spatial multiplexing and the total band channel capacity by the frequency multiplexing and select and output the mapping information and the transmission weight information from the evaluator having a larger total band channel capacity.

3. The wireless communication apparatus according to claim 2, wherein the spatial-multiplexing evaluator includes:
an interference-avoidance pre-coder to perform, when there are a plurality of communication target terminals, on the basis of the transmission line coefficients, subcarrier allocation for simultaneously transmitting signals addressed to the plurality of terminals to the plurality of terminals in same time and at a same frequency and generate an equivalent channel matrix after pre-coding using a weight matrix of the pre-coding; and
a spatial-multiplexing-channel-capacity evaluator to calculate a total band channel capacity by the spatial multiplexing using the equivalent channel matrix, set information concerning the subcarrier allocation by the interference-avoidance pre-coder and the weight matrix of the pre-coding as mapping information and transmission weight information by the spatial multiplexing, and output the mapping information and the transmission weight information together with the total band channel capacity by the spatial multiplexing.

4. The wireless communication apparatus according to claim 2, wherein the frequency-multiplexing evaluator includes:
a subcarrier allocator to perform, when there are a plurality of communication target terminals, on the basis of the transmission line coefficients, subcarrier allocation for simultaneously transmitting signals addressed to the plurality of terminals to the plurality of terminals in different subcarriers;
a weighting-coefficient selector to select a weighting coefficient from a codebook for each of the subcarriers on the basis of the transmission line coefficients or a weighting-coefficient generator to generate a weighting coefficient on the basis of the transmission line coefficients; and
a frequency-multiplexing-channel-capacity evaluator to calculate a total band channel capacity by the frequency multiplexing from reception power obtained using the weighting coefficient, set information concerning the subcarrier allocation by the subcarrier allocator and the weighting coefficient selected by the weighting-coefficient selector or the weighting coefficient generated by the weighting-coefficient generator, which generates the weighting coefficient on the basis of the transmission line coefficients, as mapping information and transmission weight information by the frequency multiplexing, and output the mapping information and the transmission weight information together with the total band channel capacity by the frequency multiplexing.

5. The wireless communication apparatus according to claim 4, wherein the subcarrier allocator allocates the subcarriers to the terminals on the basis of gains indicated by the transmission line coefficients of the terminals.

6. A wireless communication method in a wireless communication apparatus including a plurality of analog-beam formation circuits including pluralities of antennas, the wireless communication method comprising:
a transmission-line-coefficient estimating step of estimating transmission line coefficients indicating situations of transmission lines, which are channels between communication target terminals and the analog beam formation circuits;
a resource schedule step of generating, on the basis of the transmission line coefficients, mapping information of transmission symbols by spatial multiplexing and transmission weight information used for a weighting operation to a signal after mapping, generating mapping information and transmission weight information by frequency multiplexing, and selecting the mapping information and the transmission weight information by one of the spatial multiplexing and the frequency multiplexing;
a mapping step of mapping the transmission symbols on a frequency axis on the basis of the mapping information selected in the resource schedule step; and
a pre-coder step of performing, on the basis of the transmission weight information selected in the resource schedule step, a weighting operation concerning the signal mapped in the mapping step.

7. The wireless communication method according to claim 6, wherein
the resource schedule step includes:
a spatial-multiplexing evaluating step of generating mapping information and transmission weight information by the spatial multiplexing on the basis of the transmission line coefficients and calculating a total band channel capacity by the spatial multiplexing;
a frequency-multiplexing evaluating step of generating mapping information and transmission weight information by the frequency multiplexing on the basis of the transmission line coefficients and calculating a total band channel capacity by the frequency multiplexing; and
a comparing and selecting step of comparing the total band channel capacity by the spatial multiplexing and the total band channel capacity by the frequency multiplexing and selecting the mapping information and the transmission weight information by the evaluating step having a larger total band channel capacity.

8. The wireless communication method according to claim 7, wherein the spatial-multiplexing evaluating step includes:
an interference-avoidance pre-coding step of performing, when there are a plurality of communication target terminals, on the basis of the transmission line coefficients, subcarrier allocation for simultaneously transmitting signals addressed to the plurality of terminals to the plurality of terminals in same time and at a same frequency and generating an equivalent channel matrix after pre-coding using a weight matrix of the pre-coding; and
a spatial-multiplexing-channel-capacity evaluating step of calculating a total band channel capacity by the spatial multiplexing using the equivalent channel matrix, setting information concerning the subcarrier allocation in the interference-avoidance pre-coding step and the weight matrix of the pre-coding as mapping information and transmission weight information by the spatial multiplexing, and outputting the mapping information and the transmission weight information together with the total band channel capacity by the spatial multiplexing.

9. The wireless communication method according to claim 7, wherein the frequency-multiplexing evaluating step includes:

a subcarrier allocating step of performing, when there are a plurality of communication target terminals, on the basis of the transmission line coefficients, subcarrier allocation for simultaneously transmitting signals addressed to the plurality of terminals to the plurality of terminals in different subcarriers;

a weighting-coefficient selecting step of selecting a weighting coefficient from a codebook for each of the subcarriers on the basis of the transmission line coefficients; and a frequency-multiplexing-channel-capacity evaluating step of calculating a total band channel capacity by the frequency multiplexing from reception power obtained using the weighting coefficient, setting information concerning the subcarrier allocation in the subcarrier allocating step and the weighting coefficient in the weighting-coefficient selecting step as mapping information and transmission weight information by the frequency multiplexing, and outputting the mapping information and the transmission weight information together with the total band channel capacity by the frequency multiplexing.

10. The wireless communication method according to claim 9, wherein, in the subcarrier allocating step, the subcarriers are allocated to the terminals on the basis of gains indicated by the transmission line coefficients of the terminals.

* * * * *